(12) United States Patent
Fassbaender

(10) Patent No.: US 6,254,125 B1
(45) Date of Patent: Jul. 3, 2001

(54) METHOD FOR OPERATING A COMPRESSED-GAS DEVICE IN A MOTOR VEHICLE

(76) Inventor: Peter Fassbaender, Wengertstrasse 34, D-71065 Sindelfingen (DE)

( * ) Notice: Subject to any disclaimer, the term of this patent is extended or adjusted under 35 U.S.C. 154(b) by 0 days.

(21) Appl. No.: 09/343,134

(22) Filed: Jun. 29, 1999

(30) Foreign Application Priority Data

Jun. 29, 1998 (DE) ............................................. 198 29 000

(51) Int. Cl.$^7$ .................................................. B60R 21/32
(52) U.S. Cl. ............................................ 280/735; 280/736
(58) Field of Search ................................. 280/735, 736, 280/739, 741

(56) References Cited

U.S. PATENT DOCUMENTS

| | | | | |
|---|---|---|---|---|
| 5,217,249 | * | 6/1993 | Kokeguchi | 280/728 |
| 5,221,109 | * | 6/1993 | Marchant | 280/736 |
| 5,664,802 | * | 9/1997 | Harris et al. | 280/736 |
| 5,669,628 | * | 9/1997 | Kaufmann et al. | 280/739 |
| 5,707,078 | * | 1/1998 | Swanberg et al. | 280/739 |
| 5,743,558 | * | 4/1998 | Seymour | 280/739 |
| 5,829,783 | * | 11/1998 | Ishikawa et al. | 280/736 |
| 5,851,029 | * | 12/1998 | Klinger et al. | 280/736 |
| 5,853,192 | * | 12/1998 | Sikorsky et al. | 280/739 |
| 5,918,901 | * | 7/1999 | Johnson et al. | 280/739 |
| 5,947,514 | * | 9/1999 | Keller et al. | 280/742 |
| 6,039,346 | * | 3/2000 | Ryan et al. | 280/736 |
| 6,065,773 | * | 5/2000 | Klinger et al. | 280/736 |

FOREIGN PATENT DOCUMENTS

| | | |
|---|---|---|
| 40 41 049 | 7/1992 | (DE) . |
| 0 689 971 | 1/1996 | (EP) . |
| 0 790 157 | 8/1997 | (EP) . |

* cited by examiner

Primary Examiner—Eric Culbreth
Assistant Examiner—L. Lum
(74) Attorney, Agent, or Firm—Cohen, Pontani, Lieberman & Pavane

(57) ABSTRACT

A compressed-gas device for a motor vehicle which is provided with a compressed-gas cartridge. The compressed-gas cartridge is coupled with a control device. A sensor is provided which detects an accident and is coupled with the control device. The compressed-gas cartridge is provided with a vent valve with which the compressed-gas cartridge can be vented after detection of an accident.

10 Claims, 1 Drawing Sheet

METHOD FOR OPERATING A COMPRESSED-GAS DEVICE IN A MOTOR VEHICLE

BACKGROUND OF THE INVENTION

1. Field of the Invention

The present invention relates to a method for operating a compressed-gas device in a motor vehicle. The invention also relates to a compressed-gas device for a motor vehicle having a compressed-gas cartridge which is coupled with a control device and a sensor which is provided to detect an accident and which is coupled with the control device.

2. Discussion of the Prior Art

Such a method and such a compressed-gas device are known, for instance, in the form of an airbag or side bag in a motor vehicle. In such a device, a compressed-gas cartridge is provided which is filled with gas under pressure. The side bag is, for instance, connected to the compressed-gas cartridge. In the event of an accident, the compressed-gas cartridge is triggered. This means that the gas contained in the compressed-gas cartridge flows abruptly into the side bag and fills it. The side bag is in this way inflated, for instance in the manner of a cushion, and then forms a protection for the driver of the motor vehicle. The triggering of the compressed-gas cartridge and the filling of the side bag take place so rapidly that the driver is protected at the very moment of the accident against possible injuries resulting therefrom.

A side bag is provided preferably for protection in the event of a side-impact accident. It is possible, for instance, in the event of a rear-end collision that the compressed-gas cartridge of the side bag will not be triggered and the side bag will thus not be filled. In this case, the compressed-gas cartridge which is still under pressure continues to be present in the motor vehicle after the accident.

If it now becomes necessary, for instance in connection with the rescuing of the driver involved in the accident, to cut open parts of the motor vehicle by means of metal shears or the like. There is the possibility that upon this violent action on the motor vehicle the compressed-gas cartridge is damaged or destroyed, which may lead to an explosion of the compressed-gas cartridge. This obviously represents a danger for the passengers of the motor vehicle as well as for the rescue personnel.

SUMMARY OF THE INVENTION

Accordingly it is an object of the present invention to provide a method for operating a compressed-gas device in a motor vehicle, and a compressed-gas device for a motor vehicle which do not endanger the parties concerned even after an accident.

Pursuant to this object, and others which will become apparent hereafter, one aspect of the present invention resides in bringing the compressed-gas device into an unpressurized condition after an accident. In the case of a compressed-gas device of the type indicated above, the object is achieved in accordance with the invention in that the compressed-gas cartridge is provided with a vent valve by means of which the compressed-gas cartridge can be vented after detecting an accident.

In the case of the invention, a distinction is made between the moment at which the accident occurs and the time after the accident. In accordance with the invention, the compressed-gas cartridge is brought into an unpressurized condition after the accident. This, however, is carried out in the manner that any protective measures taking place at the moment of the accident are not impeded thereby. The compressed-gas cartridge is therefore in the simplest case only vented once the accident is over. If the compressed-gas cartridge was triggered by the accident and if therefore the corresponding side bag was inflated, then the compressed-gas cartridge is already without pressure and thus harmless. However, if the compressed gas cartridge was—for whatever reasons—not triggered by the accident, then the invention assures that this compressed-gas cartridge will also be vented after the accident and thus brought into an unpressurized condition.

The invention thus has the result that within a certain period of time after an accident, all compressed-gas devices of the motor vehicle are without pressure. Such unpressurized devices can no longer constitute a danger for the passengers of the motor vehicle or for rescue personnel.

The present invention relates in this case not only to a controlling of compressed gas cartridges for airbags, side bags or the like so as to make them unpressurized. In the same way, the invention can be applied in very general manner to pressure devices in a motor vehicle, for instance to a pneumatic suspension or pneumatic level control, or the like.

In one advantageous embodiment of the invention in which the compressed gas device has a compressed-gas cartridge and in which the motor vehicle is provided with a sensor for detecting an accident, the compressed-gas cartridge is vented upon detecting an accident. This represents the special application of the method of the invention to known airbag or side bag devices. In these cases, the controlling of the compressed-gas device of the motor vehicle so as to make it unpressurized is achieved by venting the compressed-gas cartridge.

It is particularly advantageous if the compressed-gas cartridge is vented after a presettable period of time. The venting of the compressed-gas cartridge is understood to mean in this connection that the gas contained in the compressed-gas cartridge at least does not flow out abruptly. In this way there is avoided, on the one hand, any influencing or even impeding of any possible inflating of the corresponding airbag or side bag caused by the accident. On the other hand, assurance is thus had that the compressed-gas cartridge becomes unpressurized in every case and is thus harmless after the presettable period of time and upon expiration of a venting period.

In a further development of the invention, the compressed-gas cartridge is vented regardless of whether it has already been triggered by the accident or not. This results in the substantial simplification that no distinction need be made between triggered and non-triggered compressed-gas cartridges. Rather, all compressed-gas cartridges of the motor vehicle are vented so that in every case the entire compressed-gas device of the motor vehicle becomes unpressurized.

Further features, applications and advantages of the invention result from the following description of the embodiments of the invention shown in the drawing. In this connection, all features described or shown form the object of the invention, both individually or in any desired combination, regardless of their combination in the claims or the referral back thereof and regardless of their wording and/or representation in the specification and/or the drawing.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWING

The sole FIGURE of the drawing shows a schematic block diagram of an embodiment of a compressed-gas device for a motor vehicle according to the invention.

DETAILED DESCRIPTION OF THE PREFERRED EMBODIMENTS

Figure 1:
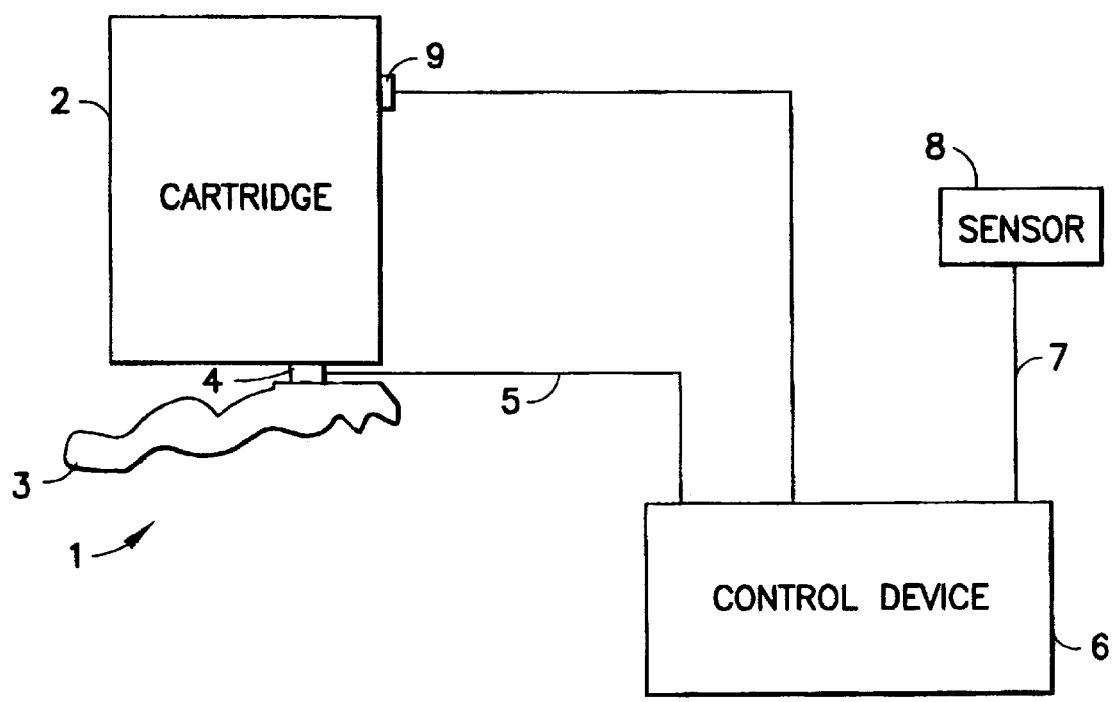

The figure shows a compressed-gas device 1 for a motor vehicle. This device 1 can be a device for operating an airbag and/or a side bag and/or a window bag and/or a belt tightener and/or the like. There can also be concerned a device for operating a pneumatic suspension and/or a pneumatic level control and/or the like.

The compressed-gas device 1 has a compressed-gas cartridge 2 which contains in its initial state a gas under pressure. The compressed-gas cartridge 2 can be a cartridge similar to those present in known devices for a side bag or a belt tightener.

The compressed-gas device 1 is provided with a side bag 3 which is connected via a release valve 4 to the compressed-gas cartridge 2. In the initial state shown, the side bag 3 is not inflated. It is understood that, instead of the side bag 3, a belt tightener or the like can also be connected to the release valve 4.

The release valve 4 can be controlled electrically. This means that the release valve 4 can be moved by an electrical signal from its closed condition in the initial state to an open condition. The release valve 4 is in this connection constructed so that this transition takes place almost instantaneously.

For the electrical control, the release valve 4 is coupled with a control device 6 via an electrical connection 5. The control device 6 can be an electrical circuit which is for instance integrated in a semiconductor chip. The control device 6 can also be a microprocessor or the like.

A sensor 8 is coupled with the control device 6 via an electrical connection 7. The sensor 8 is in very general manner provided to detect an accident.

The sensor 8 is in particular an acceleration sensor. The acceleration measured by the sensor is transmitted to the control device 6. If the sensor 8 detects in this case an acceleration which is larger than a presettable acceleration value then the control device 6 concludes that there is an accident.

In the present example of the side bag 3, the control device 6 concludes that there is an accident upon a transverse acceleration of the motor vehicle which exceeds the presettable acceleration value. The control device 6 thereupon triggers the release valve 4 and opens it abruptly. This has the result that the side bag 3 is also filled abruptly by the gas contained in the compressed-gas cartridge 2.

All this happens within an extremely short period of time. This has the result that, for instance, a driver of the motor vehicle is protected against any accident-induced injuries by the side bag 3 at the very moment of the accident.

It is possible that, for instance, in the case of a rear-end collision of the motor vehicle, the above-described side bag 3 is—correctly—not triggered due to a lack of transverse acceleration. The compressed-gas cartridge 2 with the pressurized gas contained therein is thus still present in the motor vehicle.

It is also possible that it is necessary, for instance for the subsequent salvaging of the vehicle involved in the accident or for the rescue of the driver, to cut open certain metal parts of the motor vehicle in some manner, for instance by means of metal shears or the like. This entails the danger that upon such an event the still pressurized compressed-gas cartridge 2 is destroyed and then possibly explodes. This danger is present, in particular, in the case of a window bag, the compressed-gas cartridge 2 of which is usually provided in one of the columns of the motor vehicle, for instance in the C-column.

In order to avoid this, the compressed-gas cartridge 2 is provided with a vent valve 9 which can, for instance, be a throttle valve. The vent valve 9 can be controlled electrically. This means that the vent valve 9 can be moved by means of an electrical signal from its closed condition in the initial state into an open condition. The vent valve 9 is constructed so that this transition and the following venting do not take place abruptly but relatively slowly.

The vent valve 9 is coupled with the control device 6 via an electrical connection 10. It is thus possible that the vent valve 9 is triggered by the control device 6 and the compressed-gas cartridge 2 is thereupon vented.

When the control device 6 detects an accident by means of the sensor 8, the vent valve 9 is triggered and the compressed-gas cartridge 2 vented. This venting is in this case carried out in such a manner that it never impedes the above-described and possibly carried out filling of the side bag 3 via the release valve 4.

If one describes the filling of the side bag 3 via the release valve 4 as occurring at the moment of the accident, then the venting of the compressed-gas cartridge 2 via the vent valve 9 takes place after the accident.

Generally speaking therefore, the compressed-gas device 1 of the motor vehicle is brought into an unpressurized condition after an accident, i.e. not at the moment of the accident.

There is thus no longer any danger that the compressed-gas cartridge 2 of the compressed-gas device 1 can explode upon a subsequent salvaging/rescue operation.

It is possible for the control device 6 to control and thus open the vent valve 9 after a presettable period of time upon the detection of an accident. There can, for instance, be concerned a time span within the 10-second range. This has the result that, after a total period of time which consists of the presettable period and a venting period, the compressed-gas cartridge 2 is without pressure and thus harmless.

A distinction can furthermore be made between those compressed-gas cartridges 2 which have been triggered by the release valve 4 due to the accident and those which have not been triggered. This distinction makes it possible for only the non-triggered compressed-gas cartridges 2 to be controlled via the vent valve 9 so as to make them unpressurized.

Instead of the above-described electrical control of the vent valve 9, it is also possible to trigger the venting of the compressed-gas cartridge 2 in some mechanical manner.

It is also possible for the vent valve 9 to be controlled and opened by the control device 6 already at the moment of the accident and therefore possibly together with the release valve 4. In this case, a distinction can, but need not be, made between non-triggered and triggered compressed-gas cartridges 2.

Due to the throttling function of the vent valve 9, the venting thereof upon a simultaneous triggering of the compressed-gas cartridge 2 by the release valve 4 has no influence or only a negligibly small influence on the rapid filling of the side bag 3.

The same applies in the event that, due to the course of the accident, the control device 6 detects two or more accidents in rapid succession, each of which exceeds the presettable acceleration value. Due to the throttling function of the vent valve 9, the compressed-gas cartridge 2 can sufficiently quickly fill the side bag 3 via the release valve 4 even at one of the points in time detected later on.

The above-described venting of the compressed-gas cartridge 2 takes place automatically by the control device 6 once an accident has been detected. It is also possible for the venting of the compressed-gas cartridge 2 to be effected manually by a rescuer or one of the passengers in the vehicle after an accident. In this case it is sufficient to couple the vent valve 9 with a corresponding actuating device.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

I claim:

1. A method for rendering a compressed-gas device in a motor vehicle depressurized after the vehicle is involved in an accident, comprising the step of automatically venting the compressed-gas device into ambient surroundings so as to bring the device into an unpressurized condition a period of time after the vehicle is involved in the accident.

2. A method according to claim 1, wherein the compressed-gas device has a compressed-gas cartridge, and further comprising the step of detecting the accident with a sensor mounted in the motor vehicle, the step of bringing the compressed-gas device into an unpressurized condition including automatically venting the compressed-gas cartridge after detecting the accident with the sensor.

3. A method according to claim 2, wherein the compressed-gas cartridge is vented after a presettable period of time.

4. A method according to claim 2, including venting the compressed-gas cartridge regardless of whether the cartridge has already been triggered by the accident or not.

5. A compressed-gas device for a motor vehicle, comprising:
   a compressed-gas cartridge;
   a control device coupled with the cartridge for controlling activation of the cartridge;
   a sensor provided for detecting an accident and coupled with the control device; and
   a vent valve connected to the compressed-gas cartridge so as to vent the compressed-gas cartridge into ambient surroundings a period of time after detection of the accident by the sensor.

6. A compressed-gas device according to claim 5, wherein the vent valve is a throttle valve.

7. A compressed-gas device according to claim 5, wherein the vent valve is coupled with the control device.

8. A compressed-gas device according to claim 5, and further comprising a release valve connected to the compressed-gas cartridge and coupled with the control device.

9. A compressed-gas device according to claim 5, wherein the compressed-gas cartridge is associated with at least one of the group consisting of an airbag, a side bag, a window bag, and a seat belt tightener.

10. A compressed-gas device according to claim 5, wherein the sensor is an acceleration sensor.

* * * * *